United States Patent [19]

Hutchins

[11] 4,176,570

[45] Dec. 4, 1979

[54] DICER WITH SOFT FEED APPARATUS

[75] Inventor: Clement A. Hutchins, Andover, Mass.

[73] Assignee: Bolton-Emerson, Inc., Lawrence, Mass.

[21] Appl. No.: 912,762

[22] Filed: Jun. 5, 1978

[51] Int. Cl.² .............................................. B23D 25/00
[52] U.S. Cl. .......................................... 83/355; 83/15; 83/447
[58] Field of Search ................. 83/355, 15, 438, 440, 83/444, 446, 447; 226/171

[56] References Cited

U.S. PATENT DOCUMENTS

| | | | |
|---|---|---|---|
| 2,335,515 | 11/1943 | Jehle | 83/15 |
| 3,186,277 | 6/1965 | Brunner | 83/355 |
| 3,587,373 | 6/1971 | Astrand | 83/355 |
| 3,743,155 | 7/1973 | Peterson et al. | 83/355 |
| 3,750,512 | 8/1973 | Gotham et al. | 83/447 |
| 4,139,134 | 2/1979 | Collins | 83/444 |

*Primary Examiner*—Donald R. Schran
*Attorney, Agent, or Firm*—Pearson & Pearson

[57] ABSTRACT

The horizontal platform between the feed roll nip and the rotary cutter pelletizing nip in a dicer is arranged to feed soft, limp webs of plastic without crumpling, buckling or sidewise movement by providing a multiplicity of closely spaced ribs and grooves on both the platform and on the hold down fingers, extending in the direction of feed. Friction is thus reduced in the feed direction while sidewise control is maximum for a given feed resistance. To prevent the soft plastic from wrapping around the lower feed roll it is formed with a multiplicity of small diamond protuberances separated by channels.

7 Claims, 6 Drawing Figures

U.S. Patent  Dec. 4, 1979  Sheet 1 of 2  4,176,570
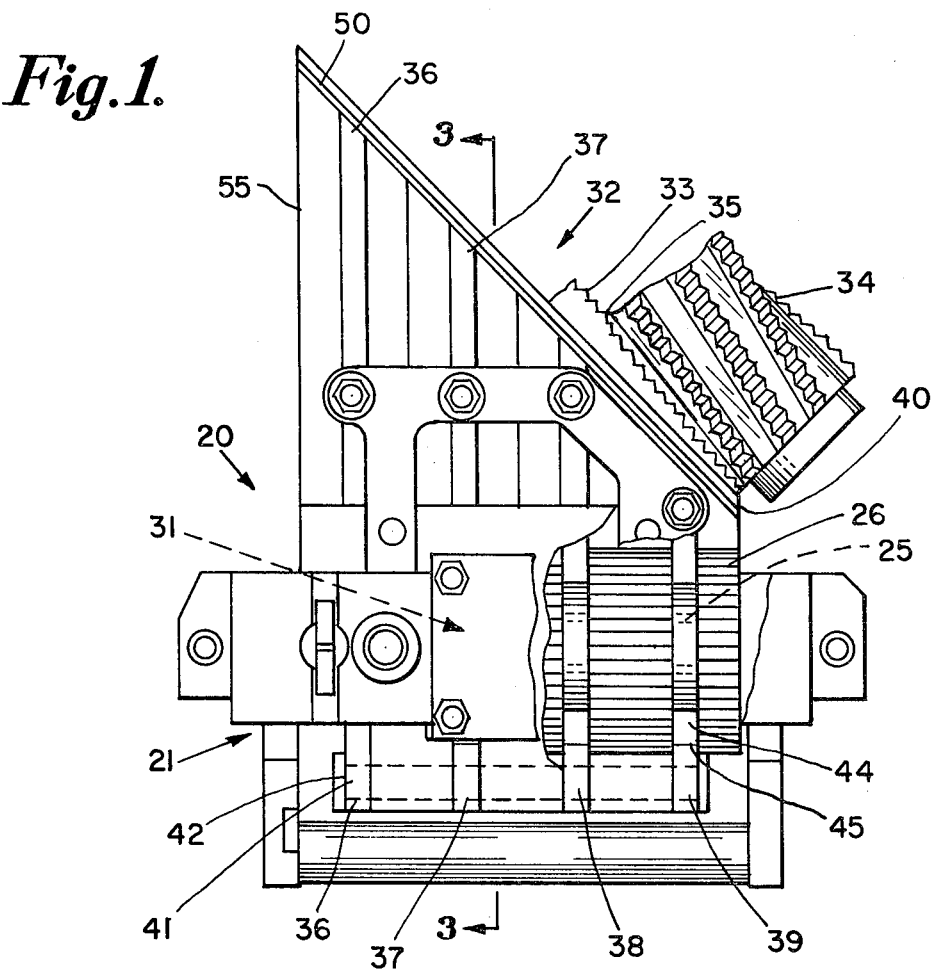
*Fig. 1.*
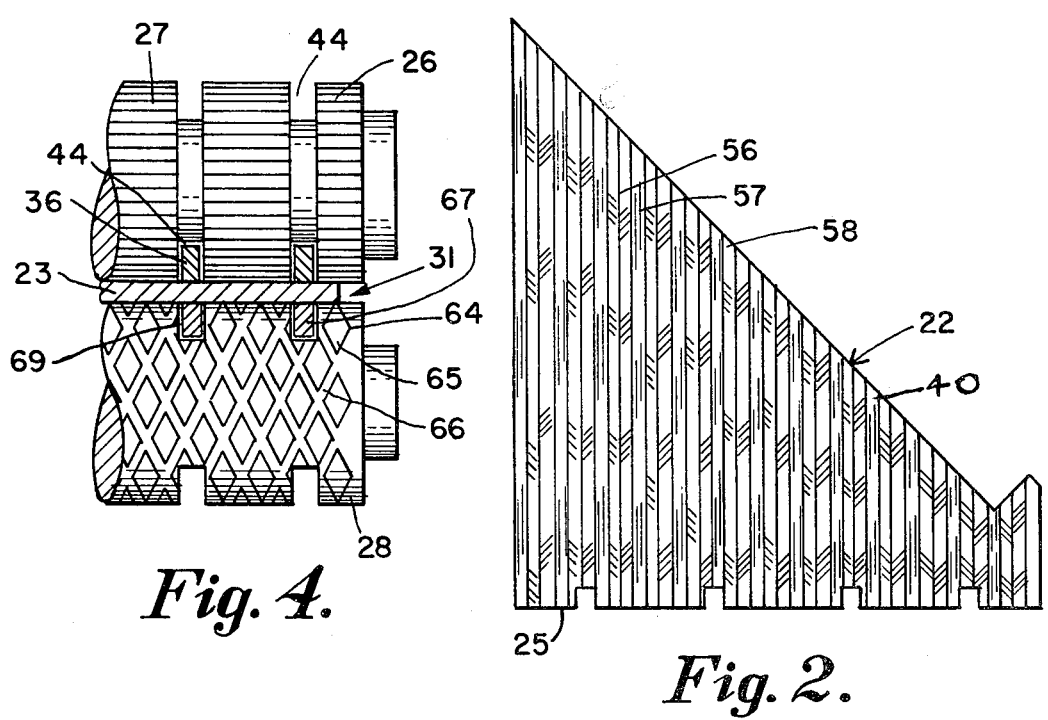
*Fig. 4.*
*Fig. 2.*

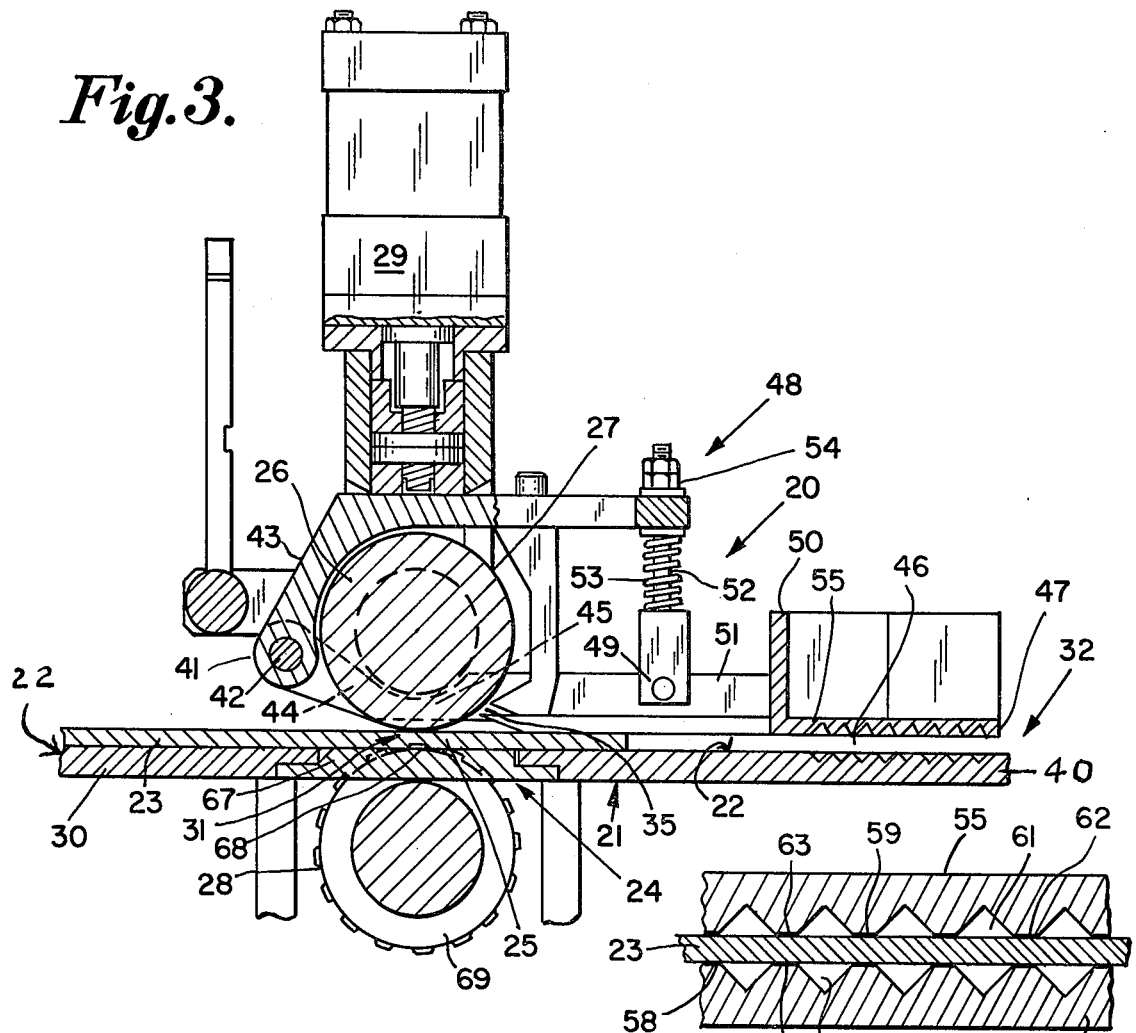
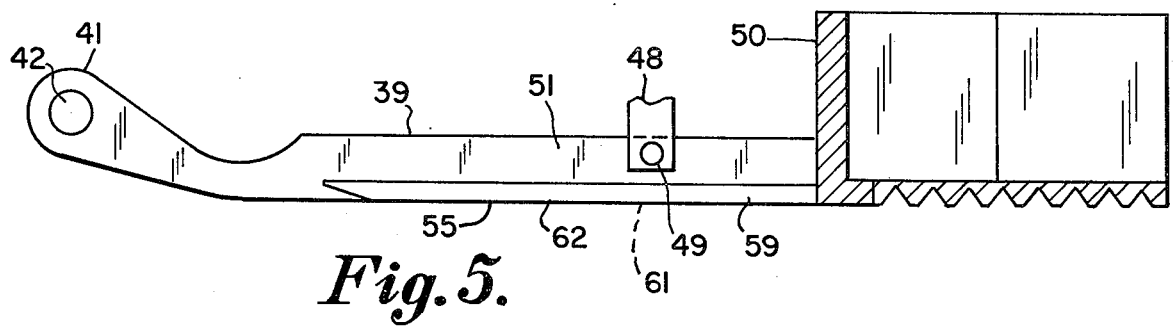

DICER WITH SOFT FEED APPARATUS

BACKGROUND OF THE INVENTION

It has long been known to provide a dicer, or pelletizer, with a horizontal platform for supporting a web of plastic, there being a pair of axially grooved feed rolls at the entrance of the platform for advancing the web, across the platform. A toothed rotary cutter with a toothed bed knife forms a nip at the exit end of the platform for receiving the plastic in the nip and cutting successive, individual pellets from the leading edge thereof. Usually the lower feed roll is driven, the upper feed roll is loaded with suitable pressure and the plastic web is relatively stiff, and not limp, soft or unduly bendable.

Such chippers, dicers, or pelletizers are shown in U.S. Pat. No. 2,335,515 to Jehle of Nov. 30, 1943, U.S. Pat. No. 2,655,213 to Anderson of Oct. 13, 1953 and U.S. Pat. No. 3,186,277 to Brunner of June 1, 1965.

SUMMARY OF THE INVENTION

As far as I am aware none of the commercially available apparatus and none of the prior patents enable each cutter tooth to cut at a precise location to make a clean cut and a uniform pellet, when the plastic to be cut is unusually flexible, rather than stiff, or when the web has a high coefficient of friction. With such high friction or soft webs, the web tends to move sidewise relative to the direction of feed so that sequential cuts on a given pellet are not correlated and the pellets are not separated from each other.

If the pressure on the hold down fingers is increased to hold the web from moving sidewise, the web of plastic will buckle.

Buckling and undue pressure on the hold down fingers are avoided in this invention by cutting a multiplicity of closely spaced, fine grooves and ribs, or striations, in the upper surface of the platform and in the lower surface of the pads of the hold down fingers all extending in the direction of feed.

These striations create a stable air flow along the grooves, breaking the vacuum of two flat surfaces together, thus reducing the resistance to web movement in the feed direction. The ribs, or ridges, between the grooves have much more contact with the web asperities in the perpendicular direction than in the feed direction, thereby providing maximum sidewise control for a given feed resistance.

Not only do soft webs tend to move sidewise and result in imperfect cuts, but the soft webs are forced into the axial grooves on the driven feed roll and extruded between the feed plate and the roll causing the web to jam. In this invention, the axial grooves on the driven feed roll are eliminated and, in place thereof, a multiplicity of diamond shaped protuberances, separated by generally helical grooves are formed on the driven lower feed roll. The adjacent diamonds overlap, to make a continuous surface for the web to be doctored off, or stripped, by the feed plate.

BRIEF DESCRIPTION OF THE DRAWING

FIG. 1 is a top plan view, of the upper feed roll assembly of a dicer of the invention;

FIG. 2 is a fragmentary top plan view of the ribbed and grooved upper surface of the horizontal feed platform;

FIG. 3 is a side elevation of the feed portion of a dicer of the invention in section on line 3—3 of FIG. 1;

FIG. 4 is a fragmentary schematic front elevation showing the upper feed rolls and staggered diamond protuberances and grooves on the lower feed roll;

FIG. 5 is a fragmentary, side elevation of a hold down finger with the ribs and grooves of the invention; and FIG. 6 is an enlarged fragmentary view showing a plastic web between the lower ribs and grooves of the hold down fingers and the upper ribs and grooves of the upper surface of the feed platform.

DESCRIPTION OF A PREFERRED EMBODIMENT

In the drawings, the feed portion 20, of a typical dicer, or pelletizer 21, is illustrated somewhat schematically, the frame, bed knife, rotary cutter head and other parts not being shown in detail because they are not part of the invention.

The feed portion 20 includes a horizontal web feed platform 22, for supporting a relatively flexible, limp web 23 of the type having a low modulus of bending and a high coefficient of friction. As stated above, it is difficult for each cutter tooth to cut such webs at a precise location to make a clean cut and a uniform cube or octahedron pellet because the soft web tends to move sidewise, to buckle under undue pressure or to wrap around a feed roll. Web feed platform 22, includes an inner feed plate 40, stripper bars 67 and an outer feed plate 30.

A pair 24 of feed rolls is mounted at the entrance end 25 of platform 22, consisting of an upper roll 26, having a surface 27 and a lower roll 28. The upper roll 26 is loaded with a predetermined pressure by means of conventional air cylinder 29 and a suitable source of air such as mill air pressure. Thus the pressure at feed roll nip 31 is controllable, depending on the characteristics of the web 23, as the nip 31 advances the web in a horizontal path along platform 22 toward the exit end 32.

As shown, a toothed bed knife 33 is fixed at the exit end 32 of platform 22 to cooperate with the driven rotary toothed cutter 34 in accepting the leading edge of a web 23 at a 45° angle. The rotary cutter 34 contains from eight to twelve helically sloped knives, a portion of a blade being in constant contact with the web at all times to maintain a constant tension with the cutting load. Dimensionally accurate pellets of cubical or octahedron shape are thus formed in the pellet cutting nip 35 of the toothed bed knife 33 and toothed rotary cutter head 34.

A plurality of hold down fingers 36, 37, 38 and 39 are mounted above the platform 22 each having one end 41 pivoted at 42 to the framepiece 43, thence extending forwardly through a circumferential groove 44 in the upper roll 26, as at 45, and thence extending forwardly along the space 46 between nips 31 and 35 to a free terminal end 47 at the exit end 32 of the platform.

The hold down pressure of each hold down finger is adjustable by means of the adjusting mechanism 48 which includes the clevis 49 straddling the upstanding portion 51 of each finger, the post 52 threaded in frame piece, or bracket 43, coil spring 53 and the turn knob 54.

Each hold down finger includes a bottom plate 55 of enlarged width, the combined width of the plates of all fingers approximating the width of the platform 22. Each finger also includes an upstanding portion 50 at the terminal end, proximate the pellet cutting nip for retaining cut pellets.

In this invention a multiplicity of closely spaced, fine, ribs 56 and grooves 57, or striations, are provided on the upper surface 58 of platform 22, all extending in the direction of feed from the feed roll nip 31 to the pellet cutting nip 35. In addition a multiplicity of closely spaced fine, ribs 59 and grooves 61, or striations, are provided in the lower surfaces 62 of the pads, or plates, 55 of the fingers 36, 37, 38 and 39, all extending in the direction of feed from the feed roll nip 31 to the pellet cutting nip 35.

The ribs 56 and 59, as shown in FIG. 6 are relatively narrow, flat and blunt to reduce the web contacting area, while presenting asperities to prevent sidewise movement of a limp, flexible web while enabling forward movement of the web. The grooves 57 and 61, on the other hand, are preferably V shaped in cross section, and relatively wide to enable a stable air flow along the grooves to break the vacuum of two flat surfaces opposed to each other. A coating of lubricant 63, such as "Teflon" or the like, may be used on the ribs 56 and 59 to further assist movement of the web 23 into the pellet cutting nip 35.

In this invention, the handling of soft, limp flexible webs is further enabled, by means of a pattern 64 of small elongated narrow diamond shaped protuberances 65, separated by helically extending grooves, or channels, 66 on the surface of the lower feed roll 28. Thus, the tendency of the surface 27 of the upper roll 26 to force the material of soft webs into the grooves and to be extruded between the feed plate and roll is overcome by the staggered diamond pattern on the lower feed roll. The adjacent diamonds overlap, making a continuous surface for the web to be doctored off by the feed plate 30 and by the stripper bars 67 which have a central portion 68 received in the circumferential grooves 69 in the roll.

I claim:

1. In a dicer of the type having a horizontal feed platform, a pair of feed rolls having a web feed nip at the platform entrance means for applying roll pressure at said nip; a toothed bed knife and a toothed rotary cutter forming a pellet cutting nip at the platform exit and a plurality of web hold down fingers in the space between said nips the combination of;
   a plurality of closely spaced, fine ribs and grooves formed in the upper surface of said horizontal feed platform and extending in the direction of feed of a web there along;
   a plurality of closely spaced, fine ribs and grooves formed in the lower surface of said web hold down fingers and extending in the direction of feed of said web;
   said ribs and grooves preventing sidewise movement of a web of plastic fed by said rolls across said platform into said pellet cutting nip without requiring undue nip pressure at said feed rolls;
   and a pattern of diamond shaped protuberances on the lower feed roll of said pair for preventing wrap around of said roll by webs of limp material.

2. A combination as specified in claim 1 wherein:
   said closely spaced, fine, ribs and grooves of said horizontal feed platform have a coating of lubricant material for assisting movement of a web in the direction of feed while said ribs and grooves prevent sidewise movement of the web.

3. A combination as specified in claim 1 wherein:
   said ribs have relatively narrow blunt, flat, web contacting surfaces to reduce friction while providing a barrier to sidewise movement of said web and said grooves are relatively wide to increase air flow proximate said web and thereby reduce resistance to advance thereof.

4. A combination as specified in claim 1 wherein:
   said lower feed roll includes a plurality of circumferentially extending grooves spaced therealong; and
   a plurality of stripper fingers are mounted on said dicer, each having a portion received in one of said grooves for preventing wrap around of said lower roll.

5. Dicer apparatus for handling plastic webs of high coefficient of friction and low modulus of bending said apparatus having a toothed bed knife and toothed rotary cutter at one end of a horizontal feed platform and a pair of feed rolls forming a feed nip at the other end of said platform, the lower feed roll being driven and the upper feed roll being loaded under predetermined pressure;
   striations in said platform extending in the direction of feed for preventing sidewise movement of said web;
   and a pattern of diamond shaped protuberances, separated by channels, on the surface of said driven, lower roll for preventing wrap around of said web.

6. Apparatus as specified in claim 5 plus:
   a plurality of hold down fingers mounted in spaced apart relation above said platform, the web contacting portion of said fingers being striated in the direction of feed of said web.

7. In a dicer
   a pair of web feed rolls, one roll of said pair having a surface and the other roll of said pair having a surface pattern of diamond shaped protuberances, with helically extending grooves therebetween, said rolls forming a nip for advancing a limp web along a horizontal path to a pellet cutting station; and
   a web support platform below the path of said web and a plurality of hold down fingers above the path of said web, said platform and fingers each having a multiplicity of closely spaced, fine, ribs and grooves extending in the direction of said pellet cutting station for preventing side wise movement of said web on said path.

* * * * *